(12) United States Patent
Greene

(10) Patent No.: US 6,272,274 B1
(45) Date of Patent: Aug. 7, 2001

(54) OPTICAL TRANSMITTING AND RECEIVING SYSTEM

(75) Inventor: Benny Allan Greene, Isaacs (AU)

(73) Assignee: Electro Optic Systems PTY LIM (AU)

( * ) Notice: Subject to any disclaimer, the term of this patent is extended or adjusted under 35 U.S.C. 154(b) by 0 days.

(21) Appl. No.: 09/319,077

(22) PCT Filed: Nov. 28, 1997

(86) PCT No.: PCT/AU97/00809

§ 371 Date: Jul. 26, 1999

§ 102(e) Date: Jul. 26, 1999

(87) PCT Pub. No.: WO98/24197

PCT Pub. Date: Jun. 4, 1998

(30) Foreign Application Priority Data

Nov. 28, 1996 (AU) ................................................. PO 3901

(51) Int. Cl.[7] .............................. G02B 6/00; H04J 14/00
(52) U.S. Cl. .............................. 385/122; 385/31; 385/38; 385/39; 385/88; 359/115; 359/124; 359/154; 359/127
(58) Field of Search ................................. 385/15, 27, 31, 385/38, 39, 88, 122; 372/21, 22, 23; 359/115, 124, 127, 154, 160

(56) References Cited

U.S. PATENT DOCUMENTS

| 5,291,503 | * | 3/1994 | Geiger et al. | 372/21 |
|---|---|---|---|---|
| 5,416,624 | | 5/1995 | Karstensen | 359/114 |
| 5,487,124 | | 1/1996 | Bowen et al. | 385/93 |
| 5,636,232 | * | 6/1997 | Goto | 372/21 |
| 5,640,405 | * | 6/1997 | Wallace et al. | 372/21 |
| 5,664,035 | | 9/1997 | Tsuji et al. | 385/24 |
| 5,841,798 | * | 11/1998 | Chen et al. | 372/11 |
| 5,841,801 | * | 11/1998 | Suzuki | 372/23 |

OTHER PUBLICATIONS

G. Bickel et al., "Bidirectional Coupler for Full Duplex Transmission on a Single Optical Fiber", SPIE vol. 139, 1978, pp. 63–69.

* cited by examiner

*Primary Examiner*—Brian Healy
(74) *Attorney, Agent, or Firm*—Knobbe, Martens, Olson & Bear, LLP

(57) ABSTRACT

A method and apparatus for transmitting and receiving optical signals in a bi-directional transmission system (1) using a common transmission medium (3). Laser radiation at the first wave length and intensity is directed from a laser source (4) to a non-linear optical device (6). The non-linear optical device (6) is responsive to radiation at the first wavelength and intensity is directed from a laser source (4) to non-linear optical device (6). The non-linear optical device (6) is responsive to radiation at the first wavelength and intensity to emit radiation of a second wavelength which is transmitted through the medium (3). The non-linear optical device (6) transmits incident radiation of the second wavelength have less than a selected intensity. A selective mirror (5) is interposed between the source (4) and non-linear optical device 6 to pass radiation of the first wavelength from the source (4) and directed towards a target (7) radiation of a second wavelength passing from the medium through the non-linear optical device (6) in the opposite direction to radiation from the source (4).

17 Claims, 1 Drawing Sheet

OPTICAL TRANSMITTING AND RECEIVING SYSTEM

FIELD OF THE INVENTION

This invention relates to an optical transmitting and receiving system for use in bi-directional transmission in a common transmission medium. In the present context, a common transmission medium refers to the common volume of any suitable medium, such as air, space or an optical fibre which is used to transmit optical signals in opposite directions at the same time.

BACKGROUND ART

In many optical applications, it is desirable to utilise the same optical path for signals travelling in opposite directions. The advantages that flow from this configuration include a reduction in the amount of optical alignment required, and where the path is through a dedicated medium such as an optical fibre, a reduction in the amount of medium required.

Prior attempts to achieve bi-directional transmission of optical signals, have utilised laser sources operating through partially reflective mirrors or, in the case of transmission through optical fibres, directional couplers. In both cases, the losses incurred by the use of the partially reflective mirrors and the directional couplers respectively have lowered the efficiency of operation.

DISCLOSURE OF THE INVENTION

It is an object of this invention to provide an improved optical transmitting and receiving system and an improved method for bi-directional transmission of optical signals in a common transmission medium.

Accordingly, the present invention provides an optical transmitting and receiving system for a bi-directional transmission system using a common transmission medium, said transmitting and receiving system including a source of a laser radiation of a first wavelength and intensity, non-linear means responsive to radiation at said first wavelength and intensity to emit radiation of a second wavelength, said non-linear means transmitting incident radiation of said second wavelength having less than a selected intensity, selective reflecting means interposed between said source and said non-linear means to pass radiation of said first wavelength from said source and reflect toward a target radiation of said second wavelength passing through the non-linear means and travelling in the opposite direction to radiation from said source.

Preferably, the non-linear means is an optical parametric oscillator (OPO). The active material of such an oscillator can be chosen to have a threshold intensity for incoming radiation below which conversion to the other wavelength will essentially not occur.

The optical transmitting and receiving system of this invention has particular application to fibre optic communications systems. The radiation generated by the non-linear means at the second frequency is launched into an optical fibre. At the other end of a typical fibre, the signal will be much weaker and the intensity will be less than the chosen operating threshold of the non-linear device. The signal will thus pass through the non-linear device and be reflected to the detector.

Preferably, the selective reflecting means includes a dichroic mirror which reflects radiation of the second wavelength to a target in the form of a suitable detector.

The optical transmitting and receiving system also preferably further includes means to launch the radiation of said second wavelength emitted by the non-linear means for transmission through a medium to a like optical transmitting and receiving system, and means to direct an optical signal from said like optical transmitting and receiving system through said non-linear means to said reflecting means.

The medium used for transmission can be any suitable propagating medium such as air, space or an optical fibre. Where required, adjustable attenuation can be provided for the radiation of said second wavelength emitted from said non-linear means to allow the intensity level of the optical signal reaching the like optical transmitting and receiving system to be reduced below said selected intensity.

Preferably, the laser source is a Nd:YAG laser operating at 1.06 $\mu$m. The non-linear means preferably converts the laser emission to 1.54 $\mu$m. In this form, the invention allows free space laser communications at the eye safe frequency of 1.54 $\mu$m, operating bi-directionally in the same space. This has the significant advantage of avoiding the need for alignment of multiple optical apertures.

One embodiment of the invention will now be described, by way of example only, with reference to the accompanying drawing.

BRIEF DESCRIPTION OF THE DRAWINGS

The accompanying drawing is a schematic illustration of a laser communication system incorporating the optical transmitting and receiving system according to this invention.

BEST MODE FOR CARRYING OUT THE INVENTION

Figure 1:
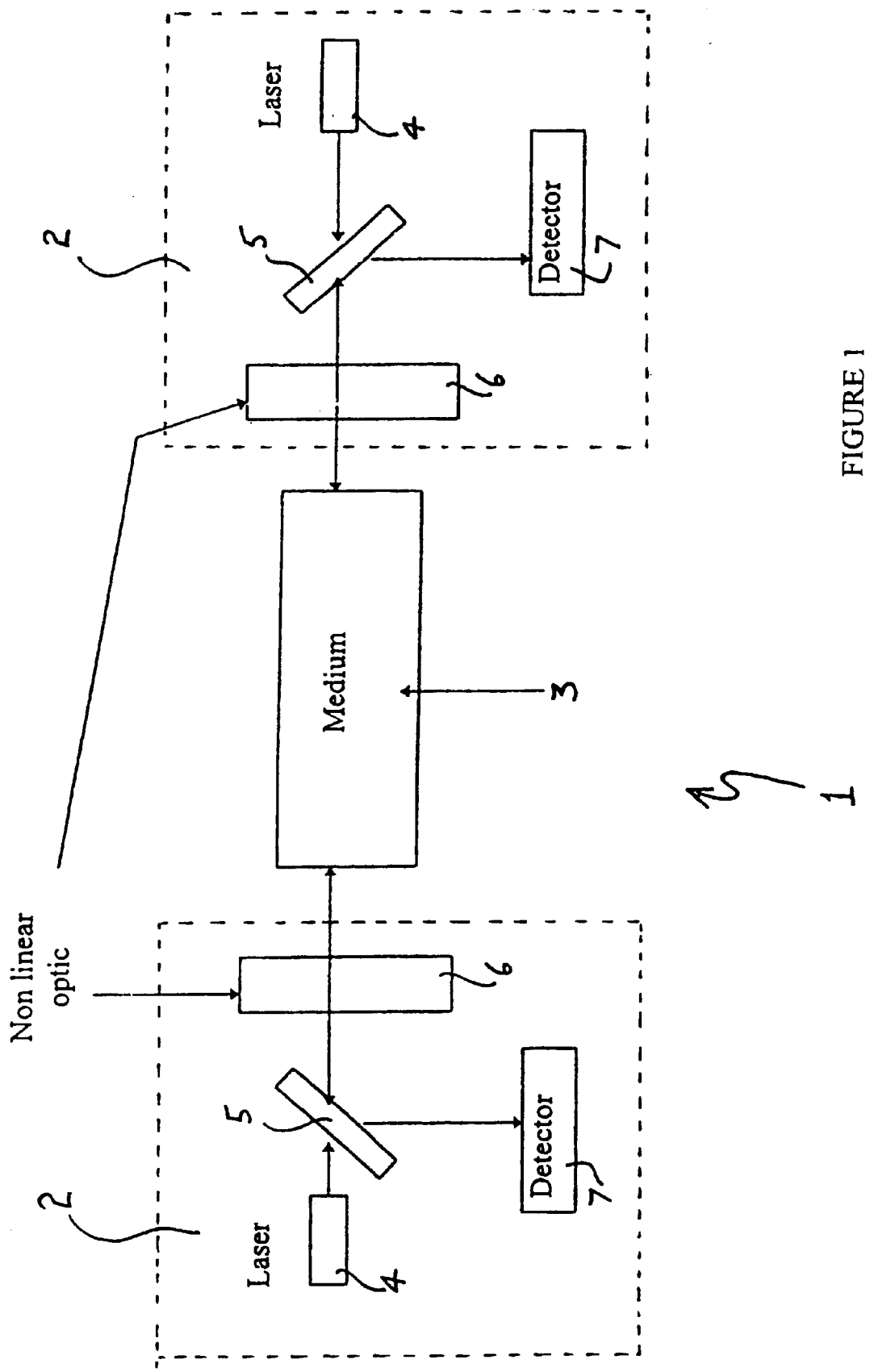

Referring to the drawing, the laser communication system 1 comprises two optical transmitting and receiving systems 2, which respectively launch signals for transmission through a medium 3. Each of the systems 2 comprises an Nd:YAG laser 4 appropriately pumped by a flash lamp or laser diode in the conventional manner to produce a laser emission at a wavelength of 1.06 $\mu$m. A dichroic mirror 5 is interposed between the laser 4 and a non-linear optical device 6 in the form of an OPO. The dichroic mirror 5 passes radiation at wavelengths around 1.06 $\mu$m, but is highly reflective at wavelengths around 1.5 $\mu$m. The laser radiation emitted by laser 4 passes through dichroic mirror 5 to OPO 6. The intensity of the incident laser radiation is above the threshold intensity for the OPO, which converts the incident radiation to radiation at a wavelength of 1.5 $\mu$m for launching into the transmission medium 3. Any suitable form of optics can be used for launching the optical signal for transmission according to the type of medium.

The signals transmitted through the medium by each of the transmitting and receiving systems 2 travel along the same optical path and are thus received at the other of the transmitting and receiving systems. If the launch intensity of the signal is appropriately chosen, the transmission of the signal through the medium reduces the intensity of the radiation to below the operational threshold of the OPO. The incoming optical signal thus passes through the OPO substantially unchanged and is reflected by dichroic mirror 5 to a detector 7 in each case. It will be apparent that a practical laser transmission system would include suitable modulating equipment associated with each laser 4 and demodulating equipment associated with each detector 7.

What is claimed is:
1. An optical transmitting and receiving system for a bi-directional transmission system using a common transmission medium, said transmitting and receiving system including:

a source of a laser radiation of a first wavelength and a first intensity, a non-linear device responsive to radiation at said first wavelength and said first intensity to emit radiation of a second wavelength, said non-linear device transmitting received radiation of said second wavelength having a second intensity less than a predetermined intensity, and a selective reflector interposed between said source and said non-linear device to pass radiation of said first wavelength from said source and reflect toward a detector, said received radiation of said second wavelength passing through the non-linear device and travelling in the opposite direction to radiation from said source.

2. An optical transmitting and receiving system as claimed in claim 1 wherein said non-linear device is an optical parametric oscillator.

3. An optical transmitting and receiving system as claimed in claim 1 wherein said selective reflector is a dichroic mirror.

4. An optical transmitting and receiving system as claimed in claim 1 wherein said common transmission medium is an optical fibre.

5. An optical transmitting and receiving system as claimed in claim 1 further including a device to selectively attenuate the radiation of said second wavelength emitted by said non-linear device.

6. An optical transmitting and receiving system as claimed in claim 1 wherein said second wavelength is an eyesafe wavelength.

7. An optical transmitting and receiving system as claimed in claim 6 wherein said second wavelength is about 1.54 $\mu$m.

8. An optical transmitting and receiving system as claimed in claim 1 wherein said source is a Nd:YAG laser operating at a wavelength of about 1.06 $\mu$m.

9. A laser communications system including two optical transmitting and receiving systems as claimed in claim 1.

10. A method of transmitting and receiving optical signals in a bi-directional transmission system using a common transmission medium, said method including:

directing laser radiation of a first wavelength and intensity from a source through a non-linear device responsive to radiation at said first wavelength and intensity to emit radiation of a second wavelength for transmission through said medium, and directing received radiation of said second wavelength from said medium through said non-linear device to selective reflector interposed between said source and said non-linear device, said selective reflector passing radiation of said first wavelength from said source and reflecting toward a detector, said received radiation of a said second wavelength travelling in the opposite direction to radiation from said source.

11. A method as claimed in claim 10 wherein said non-linear device is an optical parametric oscillator.

12. A method as claimed in claim 10 wherein said selective reflector is a dichroic mirror.

13. A method as claimed in any one of claims 10 to 12 wherein said common transmission medium is an optical fibre.

14. A method as claimed in any one of claims 10 to 13 further including selectively attenuating the radiation of said second wavelength emitted by said non-linear device.

15. A method as claimed in claim 10 wherein said second wavelength is an eyesafe wavelength.

16. A method as claimed in claim 15 wherein said second wavelength is about 1.54 $\mu$m.

17. A method as claimed in claim 1 wherein said source is a Nd: YAG laser operating at a wavelength of about 1.06 $\mu$m.

* * * * *